(12) United States Patent
Jensen et al.

(10) Patent No.: US 12,478,799 B2
(45) Date of Patent: Nov. 25, 2025

(54) NON-INVASIVE MULTI-WAVELENGTH LASER CANCER TREATMENT

(71) Applicant: CAO Group, Inc., West Jordan, UT (US)

(72) Inventors: Steven D Jensen, South Jordan, UT (US); Densen Cao, Sandy, UT (US)

(73) Assignee: CAO Group, Inc., West Jordan, UT (US)

( * ) Notice: Subject to any disclaimer, the term of this patent is extended or adjusted under 35 U.S.C. 154(b) by 0 days.

(21) Appl. No.: 18/254,592

(22) PCT Filed: Jan. 30, 2022

(86) PCT No.: PCT/US2022/014470
§ 371 (c)(1),
(2) Date: May 25, 2023

(87) PCT Pub. No.: WO2022/115881
PCT Pub. Date: Jun. 2, 2022

(65) Prior Publication Data
US 2024/0017090 A1    Jan. 18, 2024

(51) Int. Cl.
*A61N 5/067* (2006.01)
*A61N 5/06* (2006.01)

(52) U.S. Cl.
CPC ........... *A61N 5/067* (2021.08); *A61N 5/0613* (2013.01); *A61N 2005/0626* (2013.01); *A61N 2005/0659* (2013.01); *A61N 2005/0663* (2013.01)

(58) Field of Classification Search
CPC .............. A61N 5/067; A61N 5/0613; A61N 2005/0626; A61N 2005/0659; A61N 2005/0663; A61N 2005/063; A61N 2005/0651; A61B 18/203; A61B 2018/2211; A61B 18/22; A61B 2018/2065
See application file for complete search history.

(56) References Cited

U.S. PATENT DOCUMENTS

2011/0319877 A1* 12/2011 Anderson ............... A61B 5/72
606/10

OTHER PUBLICATIONS

Katta, Nitesh, et al. "Optical coherence tomography image-guided smart laser knife for surgery." Lasers in surgery and medicine 50.3 (2018): 202-212. (Year: 2018).*

* cited by examiner

*Primary Examiner* — Niketa Patel
*Assistant Examiner* — Attiya Sayyada Hussaini
(74) *Attorney, Agent, or Firm* — Dobbin IP Law, P.C.; Geoffrey E. Dobbin

(57) ABSTRACT

A cancer treatment with improved effectiveness may feature emission of radiant energy from a laser source based upon measured parameters, particularly melanin content, in a patient's surrounding tissues. Multiple wavelengths of radiant energy, pulse durations, and intensities may be utilized in the radiant energy emission based upon the patient's tissue parameters. One embodiment of a laser source features multiple laser modules (201) which may be independently operated and adjusted for intensity and active duration.

6 Claims, 2 Drawing Sheets

NON-INVASIVE MULTI-WAVELENGTH LASER CANCER TREATMENT

FIELD OF THE INVENTION

The present invention relates to the field of medical treatments and more particularly relates to a cancer treatment utilizing radiant energy at multiple wavelengths to treat cancerous tumors without invasive surgery.

BACKGROUND OF THE INVENTION

Contemporary cancer treatments comprise a process of surgically removing the tumor followed by chemo or radiation therapy; current treatments are invasive and require cutting tissue and the utilization of post-therapies that severely sicken the patient.

The clinical basis for the laser treatment is based on the findings that tumors in general are dark; with most tumors being black in color. Black tumors are very efficient at absorbing radiant energy; therefore, they are excellent targets for laser directed energy that are designed to heat the cancer cell sufficiently to denature it without damaging healthy tissues. The purpose of the present invention is to utilize specific wavelengths of light that have minimal absorption in soft healthy tissue and are therefore essentially harmless to healthy cells at the appropriate energy densities; yet become very absorptive and lethal to tumors at the same energy densities. The present invention is designed to pass harmlessly through a mass of healthy soft tissue until it arrives at a tumor where the absorption of radiant energy is significantly greater for the specified laser energy; then heat the cancer cell sufficiently that it becomes denatured; such that it is removed by the physiological processes of the body during the healing process.

The present invention is designed to provide a non-invasive cancer treatment that requires no cutting of tissue or the administration of chemotherapy drugs or radiation treatments. The present invention utilizes lasers with specific wavelengths that are selected from a group of wavelengths that have minimum absorption characteristics when directed toward soft tissue. Human Soft tissue in general has 5 main components which absorb most of the radiant energy: melanin, water, blood, bone, and fat.

Melanin pigments by nature are designed to absorb light, therefore they are the biggest factor for radiant energy transparency. Melanin absorbs light to such an extent that darker skinned individuals would require a different laser treatment protocol than someone who is lighter skinned. Melanin becomes least absorbent at the far end of the narrow wavelength window at 1350 nm. However, water becomes as absorbent as melanin at 1350 nm and diminishes the prospect of an overall effective treatment. Melanin, blood, and water have a sweet spot at 1000 nm-1100 nm where they converge at an absorbency minimum with about 1050 nm being a good average center point. The most difficult patient to treat with the present invention are those with the most melanin and would therefore receive the most beneficial cancer treatment at a wavelength of about 1050 nm. Other wavelengths would be excluded depending on the amount of melanin in the skin. The amount of melanin in the skin must be quantified prior to laser treatment to determine if other wavelengths would be beneficial to the patient. Nevertheless, there would be a threshold at which 1050 nm would be the dominant treatment wavelength for those with increasingly darker skin.

Water makes up an abundant portion of soft tissue and is least absorbent at 650 nm; it becomes increasingly more absorbent as it approaches 1350 nm. Water and melanin are least absorbent at opposite ends of the narrow window spectrum and therefore present the greatest obstacles for a simplified laser treatment. Where melanin is not a dominant factor, then water becomes the next biggest factor because of the abundance of water found in physiological tissue. Light skinned patients would therefore benefit from a procedure that utilized 650 nm as the predominant wavelength for tissue transparency over all other wavelengths.

Blood has an absorbance minimum within the narrow window at about 680 nm-735 nm with a good average point at about 700 nm. Blood becomes a factor when arteries are within the treatment area; if it were determined that there was an artery that lies in front of the tumor then the dominant treatment wavelength would be about 700 nm to minimize the absorption of the larger abundance of blood found in arteries.

Bone is another key component in human body in addition to components in soft tissue. Bone tissue consists of 50-70% of hydroxyapatite, 20-40% of collagen and protein, 5-10% of water, and some lipids. Hydroxyapatite in the bone has low absorption from 400 nm to 2000 nm. Any wavelength with low absorption in water, blood, and fat will have low absorption with hydroxyapatite. Collagen in the bone has low absorption for wavelength at about 900 nm and 1100 nm. Hydroxyapatite and collagen shall be the main consideration for bone since other components are similar in soft tissue.

Fat has an absorbance minimum within the narrow window at about 775 nm-805 nm with a good average midway point at about 790 nm. Fat becomes a factor as its depth increases, therefore patients with increasing amounts of physiological fat would benefit by a dominant treatment wavelength at about 790 nm. Prior to a laser treatment, each patient's depth of fat within the treatment area would be determined and be utilized within a custom treatment plan for that patient.

The present invention utilizes a narrow band of wavelengths from 650 nm-1350 nm of radiant energy, especially when the radiant energy is produced by a laser; it is at these wavelengths that soft tissue has minimum absorption.

SUMMARY OF THE INVENTION

In view of the foregoing disadvantages inherent in the known types of cancer therapies, an improved multi-wavelength cancer therapy may provide a laser therapy that meets the following objectives: that it is easy to implement, that it utilized at least two different frequencies of radiant energy, and that it is effective without invasive surgery. As such, a new and improved methodology may comprise several steps determining an ideal pattern or patterns of wavelengths of radiant energy of specific pulse durations and intensity based upon those factors through MRI or CT scan images and artificial intelligence to accomplish these objectives.

The more notable features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions as far as they do not depart from the spirit and scope of the present invention.

DETAILED DESCRIPTION OF THE PREFERRED EMBODIMENT

With reference now to the drawings, a preferred embodiment of the multi-wavelength laser therapy is herein described. It should be noted that the articles "a," "an," and "the," as used in this specification, include plural referents unless the content clearly dictates otherwise.

Figure 1:
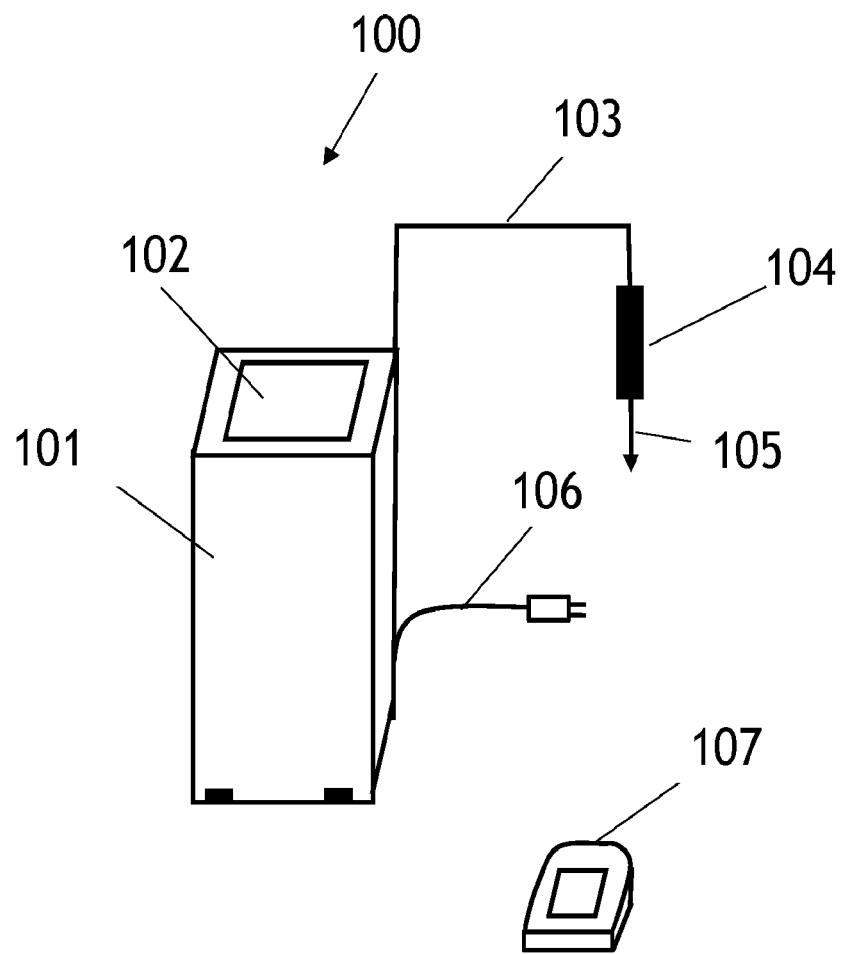
FIG. 1 is a schematic overview of a laser system for treatment according to one embodiment of the present invention.

FIG. 1 depicts an overview of laser system where (100) is a laser system with a casing made of plastic, metal, or any suitable material (101). There are control electronics, laser modules, a wi-fi module, data input ports, power supply, and other components inside the casing (101). A display (102) shows system information and operating control of laser system. There is an articulated arm (103) attached to laser system. This arm (103) holds fiber cable to deliver laser beams and can be designed to move in three-dimensional space controlled by the laser system (100) for desired position of laser beams. A hand piece (104) is located at end of arm (103) to contain optics to shape the laser beam as a parallel beam (105) and to deliver laser beams to treatment location. While there is a power cord (106) to provide power for the system, the system can also be operated by rechargeable battery. There is a wireless footswitch (107) to control laser beam if needed.

Figure 2:
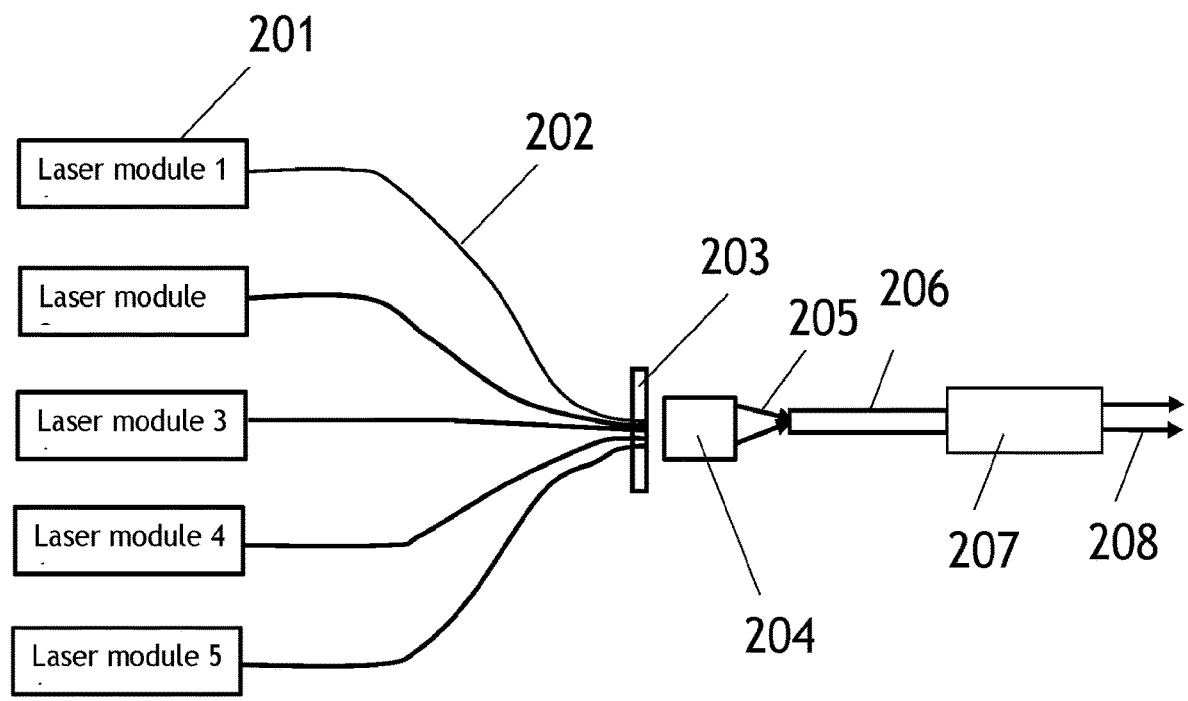
FIG. 2 is a schematic of a laser module structure for use in a laser system such as the one depicted in FIG. 1.

The laser beams may be generated by multiple laser modules as illustrated in FIG. 2, where each wavelength is generated by a laser module to a one. The quantity of laser modules (201) will depend on the total wavelengths to be used in the system. In FIG. 2, there are illustrated 5 laser modules (201). Each laser module (201) has a casing containing a laser generation source which can be a semiconductor laser, a diode pumped laser, or a solid-state laser. The laser source is fiber coupled into a simple fiber cable (202) and then to a fixture (203) which bundles all the fibers and directs laser light from the fibers (202) into a first optical system (204). Optical system (204) then directs laser light (205) from bundled fibers into a single fiber (206) which is attached to a second optical system (207) that collimates the laser light (205) into a parallel beam (208). The parallel beam (208) is then aimed into treatment area.

It is to be understood that the present invention would benefit by the utilization of a smart programmable laser because of the multiple factors that must be considered for each patient there isn't a single simple treatment regime that would be effective for all patients. On the contrary, an understanding of an individual's melanin content, fat content, and arterial location would be significant factors for developing an effective laser treatment.

The radiant energy source, preferably a laser such as shown in FIG. 2, must be able to deliver the desired wavelengths of light to the treatment area on a programmable basis such that any one of multiple wavelengths can be irradiated in a predetermined pattern, thus creating a customized treatment therapy. Also, the duration and the intensity of each pulse or pulses of a specific wavelength should have the capability to be individually varied to maximize tumor denaturing efficiency and minimize the heat to healthy tissue. The preferred laser source is a diode laser, and the preferred delivery medium is through a fiber optic cable that can be placed directly against the skin immediately over the treatment area.

An example of developing a customized treatment regime for a patient would in general be like this:
1. Locate the tumor; by MRI, CT scan or other method locate the tumor and determine if the overall depth exceeds the maximum soft tissue penetration capabilities of the laser. The safest, shortest, and most effective path to the tumor site needs to be determined and then that distance measured. The images of MRI and CT can also be imported into laser system and system will use algorithm to determine laser emission power, sequence to treat tumors.
2. Measure a patient's melanin content within the treatment area.
3. Determine the number of arteries between the laser and the tumor.
4. Measure the average layer of fat within the treatment zone.
5. Enter the gathered information into the smart laser that calculates a treatment therapy establishing a customized pattern or patterns of wavelengths of radiant energy of specific pulse duration(s) and intensity based upon those factors.
6. Irradiate the treatment area with the prescribed number of treatment patterns according to the calculated treatment therapy. The therapy may involve a single wavelength of radiant energy being emitted onto the treatment area, or a plurality of wavelengths being emitted sequentially or simultaneously, with varying pulse durations and/or intensities.
7. After healing, scan the tumor again to determine the success of the previous treatment; based upon the finding adjust the next therapy session to maximize the further denaturing of the existing cancer.
8. Repeat the therapy sessions to eventually shrink or destroy the tumor; comprising a standardized treatment regime.

It is to be understood that the present invention will in most cases require a treatment regime with multiple treatment therapies to be effective. The goal is to denature the tumor in layers. From a practical standpoint, the radiant energy will interact with the outermost layer of the tumor initially and denature it first. The next step is to allow the denatured tumor to heal and be replaced by healthy tissue that becomes by default transparent to the next laser treatment. Then the next laser therapy irradiates the new tumor boundary and over a repeated process the tumor is diminished in subsequent layers until extinction.

It is to be understood that the present invention could be utilized in conjunction with contemporary methods of cancer treatment such as surgery, chemotherapy, radiation treatments and any other cancer treatment. For example, an oncologist could determine that surgery to remove the portions of a tumor accessible to a scalpel would be removed first. Then the laser therapy could treat the portions of the tumor that are not readily accessible to the scalpel. In another example, an oncologist could utilize the laser therapy to irradiate and treat portions of a tumor that are accessible to radiant energy and then utilize chemotherapy to treat those portions of cancer not accessible to light. By combining the new and novel methods of the present invention with traditional cancer treatments, it is the intended outcome to reduce the detrimental side effects and invasiveness inherent in contemporary cancer treatments.

INDUSTRIAL APPLICABILITY

The present invention may be practiced in industry, particularly in the medical field. Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A method of treating cancerous tumors with a laser, the method comprising:
   a step of gathering information further comprising sub-steps of:
      a sub-step of locating the tumor and determining if an overall depth of the tumor within surrounding tissue of a treatment area exceeds maximum soft tissue penetration capabilities of the laser;
      a sub-step of measuring a melanin content of tissues within the treatment area;
      a sub-step of determining a number of arteries between the tumor and an intended location of the laser; and
      a sub-step of measuring an average layer of fat within the treatment area; and
   a step of entering gathered information from previous sub-steps into a smart laser system that calculates a treatment therapy, establishing at least one customized treatment pattern of wavelengths of radiant energy, specific pulse duration, and intensity based upon the gathered information; and
   a step of irradiating the treatment area with the at least one customized treatment pattern creating a laser treatment program for a single therapy session.

2. The method of claim 1, the radiant energy having a wavelength between 650 nm-1350 nm.

3. The method of claim 1, further comprising a step of excising at least a portion of the tumor before subjecting it to the step of irradiating the treatment area.

4. The method of claim 1 further comprising a follow-up step of administering chemotherapy after at least one step of irradiating the treatment area.

5. The method of claim 1, further comprising a step of providing a laser system capable of selectably emitting radiant energy of different wavelengths discretely and simultaneously.

6. The method of claim 5, wherein a plurality of wavelengths of radiant energy are emitted and each wavelength is emitted at pulse durations and intensities independent of other emitted wavelengths of radiant energy.

* * * * *